US012560465B2

(12) United States Patent
Ryskamp et al.

(10) Patent No.: US 12,560,465 B2
(45) Date of Patent: Feb. 24, 2026

(54) ULTRASONIC FLOWMETER WITH ASYMMETRICAL TRANSDUCER WINDOWS

(71) Applicant: Sensia Netherlands B.V., Rotterdam (NL)

(72) Inventors: Ross Ryskamp, Pittsburgh, PA (US); Gregor James Brown, Prestwick (GB); Ryan Yonish, Bethel Park, PA (US)

(73) Assignee: Sensia Netherlands B.V., Rotterdam (NL)

( * ) Notice: Subject to any disclaimer, the term of this patent is extended or adjusted under 35 U.S.C. 154(b) by 340 days.

(21) Appl. No.: 18/309,465

(22) Filed: Apr. 28, 2023

(65) Prior Publication Data

US 2023/0349739 A1     Nov. 2, 2023

Related U.S. Application Data

(60) Provisional application No. 63/336,704, filed on Apr. 29, 2022.

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
CPC ................................. G01F 1/662; G01F 1/667
See application file for complete search history.

(56) References Cited

U.S. PATENT DOCUMENTS

| | | | |
|---|---|---|---|
| 2,865,196 | A | 12/1958 | Bordenave et al. |
| 3,835,704 | A | 9/1974 | Elazar et al. |
| 3,925,692 | A | 12/1975 | Leschek et al. |
| 4,031,757 | A | 6/1977 | Colton |
| 4,237,729 | A | 12/1980 | Kurtz et al. |
| 4,913,159 | A | 4/1990 | Gardin et al. |
| 5,383,369 | A | 1/1995 | Khuri-Yakub et al. |
| 5,728,948 | A | 3/1998 | Bignell et al. |
| 6,089,104 | A | 7/2000 | Chang |
| 6,539,812 | B1 | 4/2003 | Bergamini |
| 6,895,825 | B1 | 5/2005 | Barkhoudarian |
| 7,845,240 | B1 | 12/2010 | Stehouwer |
| 8,534,138 | B2 | 9/2013 | Gottlieb et al. |
| 8,544,343 | B2 | 10/2013 | Gottlieb et al. |
| 9,322,689 | B2 | 4/2016 | Gottlieb et al. |
| 2002/0011119 | A1 | 1/2002 | Bignell et al. |
| 2007/0034016 | A1 | 2/2007 | Maginnis et al. |
| 2007/0227263 | A1 | 10/2007 | Fukano et al. |

(Continued)

FOREIGN PATENT DOCUMENTS

RU        2375682 C1 * 12/2009

OTHER PUBLICATIONS

Translation of RU-2375682-C1 (Year: 2009).*

(Continued)

*Primary Examiner* — Nathaniel T Woodward
(74) *Attorney, Agent, or Firm* — Foley & Lardner LLP

(57) ABSTRACT

Systems and methods provided herein relate to an ultrasonic transmission link including a transmitter connected to a first acoustic window that is in contact with a transmission medium and a receiver connected to a second acoustic window in contact with the transmission medium, wherein the geometry and/or material properties of the first and second acoustic windows are asymmetrical.

20 Claims, 14 Drawing Sheets

(56)                    References Cited

U.S. PATENT DOCUMENTS

2008/0289433 A1     11/2008  Lohrmann et al.
2019/0390991 A1 *   12/2019  Pape ...................... G01F 1/663

OTHER PUBLICATIONS

Written Opinion for Appl. Ser. No. PCT/US2023/020453 dated Apr. 2, 2024 (6 pages).
International Search Report and Written Opinion for International Patent Application PCT/US2023/020453 dated Aug. 17, 2023 (14 pages).

* cited by examiner

Primary and Reflected Waves with 0.5 Period Delay Between Reflected Waves

Resulting Signal from Superposition of the Primary and Reflected Waves

Primary and Reflected Waves with 5 Period Delay Between Reflected Waves

Resulting Signal from Superposition of the Primary and Reflected Waves

ULTRASONIC FLOWMETER WITH ASYMMETRICAL TRANSDUCER WINDOWS

CROSS-REFERENCE TO RELATED PATENT APPLICATION

This application claims the benefit of and priority to U.S. Provisional Application No. 63/336,704, filed Apr. 29, 2022, the entire disclosure of which is incorporated by reference herein.

BACKGROUND

The present disclosure relates to flow meters. Flow meters can be used to measure fluids (i.e., production fluids and injection fluids) passing through conduits. In some instances, operators use ultrasonic flow meters for such measurements. Ultrasonic flow meters include ultrasonic transducers for transmitting and detecting ultrasonic waves (i.e., ultrasonic signals) in a fluid passed through the meter. The flowing fluid interacts with the ultrasonic signals transmitted through the fluid. This allows the received ultrasonic signals to be used to infer characteristics of the fluid, such as velocity and volumetric flow rate.

A transit time ultrasonic flow meter quantifies fluid flow based on the transit time difference of an upstream versus a downstream ultrasonic signal. For example, U.S. Pat. No. 4,300,400, titled "Acoustic Flowmeter with Reynolds Number Compensation" discloses one such transit time ultrasonic flow meter. In some cases, reflections of the ultrasonic signals can cause undesirable signal characteristics. Such undesirable signal characteristics can cause errors in applications such as transit time ultrasonic flow measurement.

SUMMARY

One implementation of the present disclosure relates to an ultrasonic transmission link including a transmitting ultrasonic transducer connected to a first acoustic window that is in contact with a transmission medium and a receiving ultrasonic transducer connected to a second acoustic window in contact with the transmission medium, wherein the geometry and/or material properties of the first and second acoustic windows are asymmetrical.

Some embodiments relate to an ultrasonic system including a transmitter in connection with a first acoustic window that is in contact with the transmission medium and a receiver in connection with a second acoustic window that is also in contact with the transmission medium. The geometry and/or material properties of the first and second acoustic windows are asymmetrical.

In some embodiments, parameters of the first and second acoustic windows are selected to inhibit constructive interference of secondary reflections. In some embodiments, the asymmetry is achieved by having first and second acoustic windows of different thicknesses. In some embodiments, the material properties of the first and second acoustic windows are varied to achieve the desired asymmetry. In some embodiments, thickness properties of the first and second acoustic windows are varied to achieve the desired asymmetry. In some embodiments, both material properties and thicknesses are varied to achieve the desired asymmetry.

In some embodiments, a difference in transit time across the first and second acoustic windows is given by $(n+0.5)T$ where n is an integer and T is the period of a primary signal. In some embodiments, the asymmetry in the parameters is sufficiently large such that a difference between round-trip transit times in the first and second acoustic windows is greater than a duration of a primary signal In some embodiments, the acoustic windows are of the same material and a difference in thickness of the acoustic windows is given by $0.5(n+0.5)\lambda$ where n is an integer and $\lambda$ is the wavelength of a primary.

Some embodiments relate to a method used inn an ultrasonic system for measuring flow in a medium comprising a transmitter and a receiver. The method includes providing an ultrasonic signal through a first acoustic window of the transmitter, the first acoustic window being in contact with the transmission medium, and receiving the ultrasonic signal through a second acoustic window of the receiver. The second acoustic window is in contact with the transmission medium, and the geometry and/or material properties of the first and second acoustic windows are asymmetrical.

In some embodiments, parameters of the first and second acoustic windows are selected to inhibit constructive interference of secondary reflections. In some embodiments, the asymmetry is achieved by having first and second acoustic windows of different thicknesses. In some embodiments, the material properties of the respective acoustic windows are varied to achieve the desired asymmetry. In some embodiments, thickness properties of the first and second acoustic windows are varied to achieve the desired asymmetry. In some embodiments, wherein both material properties and thicknesses are varied to achieve the desired asymmetry.

In some embodiments, a difference in transit time across the first and second acoustic windows is given by $(n+0.5)T$ where n is an integer and T is the period of a primary signal. In some embodiments, the asymmetry in the parameters is sufficiently large such that a difference between round-trip transit times in the first and second acoustic windows is greater than a duration of a primary signal. In some embodiments, the first and second acoustic windows are of the same material and a difference in thickness of the first and second acoustic windows is given by $0.5(n+0.5)\lambda$ where n is an integer and $\lambda$ is the wavelength of a primary signal.

Some embodiments relate to an ultrasonic flow meter. The meter includes a pair of ultrasonic devices, a meter body configured to be coupled to a conduit for a medium, and meter electronics in communication with the pair of ultrasonic devices configured to determine a flow in response to an ultrasonic signal. The pair of ultrasonic devices are disposed in the meter body in opposition. A first device of the pair of ultrasonic devices has a first acoustic window in contact with the medium, and a second device of the pair of ultrasonic devices has a second acoustic window that is also in contact with the transmission medium. The geometry and/or material properties of the first and second acoustic windows are asymmetrical.

In some embodiments, a difference in transit time across the first and second acoustic windows is given by $(n+0.5)T$ where n is an integer and T is the period of a primary signal This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 is a cross-sectional view of a flow meter body, according to some embodiments.

DETAILED DESCRIPTION

Overview

Figure 1:
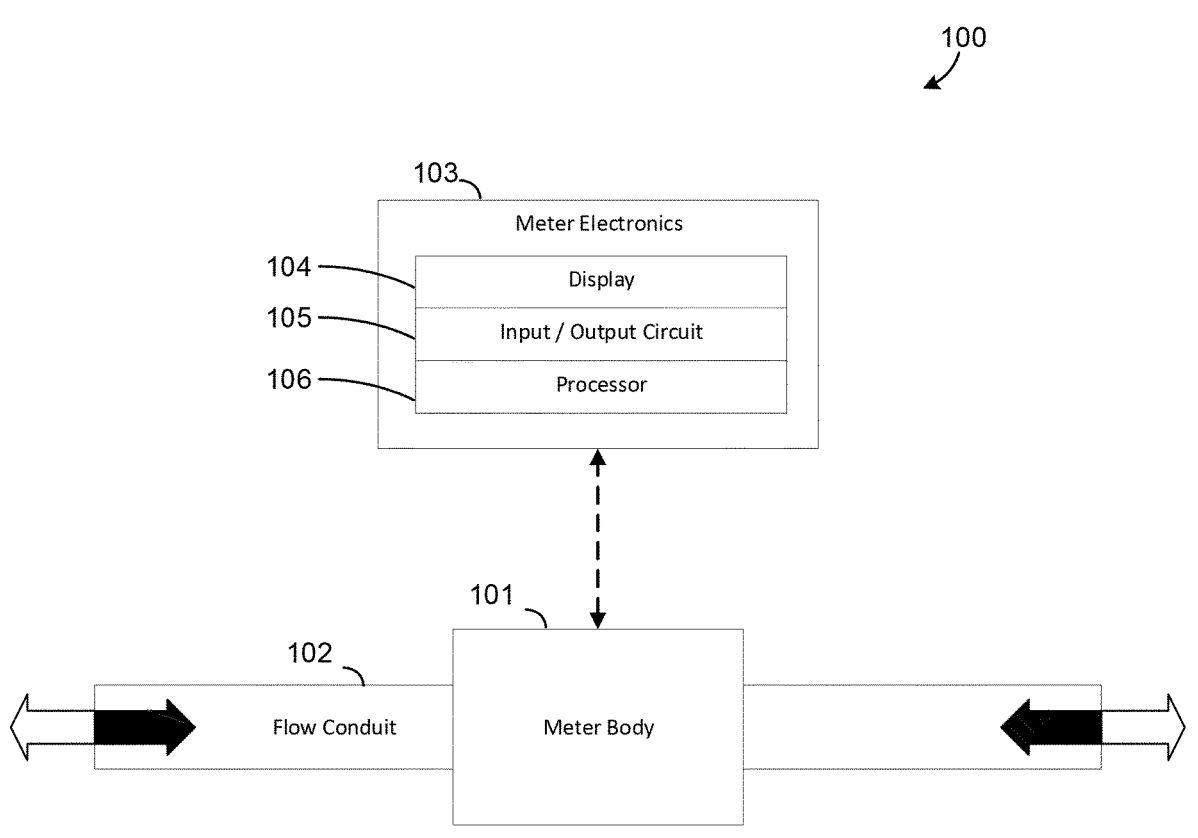
FIG. 1 is a block diagram of a flow measurement system, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to ultrasonic measurement systems, including, but not limited to, ultrasonic flow meters. Some ultrasonic flow meters use ultrasonic transducers arranged to determine fluid flow through a conduit. When fluid is flowing in a conduit, a sound pulse (i.e., an ultrasonic signal) transmitted from one transducer across the conduit in the direction of flow (i.e., a downstream ultrasonic signal) will travel faster than a pulse transmitted against the direction of the flow from another transducer (i.e., an upstream ultrasonic signal). A transit time ultrasonic flow meter quantifies fluid flow based on the measured transit times of the signals and other calculation inputs. The difference in the transmit times of downstream and upstream signals on a given path is proportional to the velocity of fluid on that path.

Transit time flow meters may arrange transducers in a pitch-catch configuration (i.e., using two transducers per signal path). In such cases, a first transducer may be considered a transmitting transducer (i.e., the "pitching transducer"), and a second transducer may be considered a receiving transducer (i.e., the "catching transducer"). The transmitting transducer produces a pressure wave (i.e., an ultrasonic signal) that is received by the receiving transducer. Accordingly, the excitation of the pitching transducer may be used to determine a "departure time" of an ultrasonic signal, and the signal received at the catching transducer may be used to record the "arrival time" of the ultrasonic signal. One such method uses the detection of peaks and associated zero-crossings within the "leading edge" of the received ultrasonic signal. Essential to the measurement of transit time, accordingly, is the repeatable and reliable detection of the arrival time of the ultrasonic signals. Transit time flow meters may therefore rely on the detection of a particular peak within the leading edge of the received signal waveform to calculate the transit time of an ultrasonic signal travelling from the transmitting transducer to the receiving transducer. For an accurate transit time measurement, it is imperative that the peaks and zero-crossings within the ultrasonic signal can be identified consistently.

Transducers used in ultrasonic flow meters often include a housing, which may include an acoustic window (sometimes referred to as a "buffer"). The acoustic window is a thickness of material placed between the transducer and the media through which the signal is to be transmitted, normally used to protect the transducer or prevent exposure of the transducer to process conditions. Such windows are often required to withstand relatively high process pressures and will typically be equal to multiple ultrasonic wavelengths in thickness. Each material forming the ultrasonic signal transmission path, including the transducer housing and the media through which the signal is to be sent, exhibits an acoustic impedance. Due to acoustic impedance mismatches between the materials that form the ultrasonic transmission path, a portion of the ultrasonic signal is reflected at the different interfaces rather than transmitted through them.

At interfaces with high acoustic impedance mismatch, the reflected portion of the signal compared to the transmitted portion of the signal can be significant. A reflected signal in the transmitting transducer housing and transducer assembly can ultimately be transmitted through the fluid to the receiving transducer housing. This signal is delayed relative to the primary signal by the transit time corresponding to its 'round-trip' of the reflection from the window/fluid interface back through the window material and any other materials, to a second point of reflection, and then forward again through any other materials and the window material. When the primary signal arrives at the receiving transducer, a portion of it will also reflect within the receiving transducer and transducer housing assembly (including the acoustic window). Such reflections can cause undesirable signal characteristics that can cause errors in applications such as transit time ultrasonic flow measurement.

In some cases, housings of the transmitting transducer and the receiving transducer form the same (i.e., "symmetrical") dimensions and/or geometries. With symmetrical transducer geometries and materials, the aforementioned reflections at the receiving transducer will occur with the same delay time as, and be in phase with, the reflections that occurred at the transmitting transducer. These "in-phase" reflections can ultimately combine constructively at the receiving transducer producing a series of secondary peaks that are delayed with respect to the leading edge. Under certain conditions these secondary peaks can be greater in amplitude than the peaks at the leading edge of the waveform.

The presence of secondary peaks can have an undesirable effect on signal processing strategies, including the application of automatic gain control (AGC) and threshold-based peak detection. The objective of AGC is to amplify the received signal until it reaches a desired maximum peak voltage. It is intended that the measured signal peaks that drive the AGC process are in the "leading edge" of the signal. However, with strong secondary reflected peaks present that exceed the magnitude of the peaks in the leading edge, the secondary peaks can unintentionally be used to set the AGC level. Likewise, threshold-based peak detection algorithms used in ultrasonic signal transit time measurement, which aim to consistently identify peaks in the leading edge of the signal, can suffer from inaccuracy when there are larger secondary peaks present. More specifically, when the secondary signal peaks are greater in magnitude than the primary signal peaks, the primary signal peaks may fall below the amplitude threshold defined by the threshold-based peak detection algorithm. This can result in the threshold-based peak detection algorithm erroneously identifying the secondary peaks as the leading-edge ultrasonic signal. Accordingly, there is a need for a transducer housing design for transit time ultrasonic flow meters that addresses the aforementioned concerns relating to symmetrical transducer geometries and materials.

Various embodiments disclosed herein relate to an ultrasonic transmission link with transducers in a pitch-catch configuration with asymmetrical acoustic windows of different thickness and/or geometry such that constructive interference of secondary reflections is impeded or avoided. The use of asymmetrical window thicknesses can promote destructive interference of the reflections described above, thereby reducing undesirable signal characteristics that may otherwise occur as a result. The use of appropriately designed asymmetrical windows can also avoid constructive interference of reflections that can otherwise cause undesirable signal characteristics.

In various embodiments disclosed herein, the round-trip travel time of reflections through the transmitter window versus the receive window is controlled to ensure constructive interference does not occur. In some embodiments, this is achieved by ensuring that the round-trip travel time of reflections through the transmitter window versus the receiving window is different by one-half (or an odd multiple of one-half) of the expected signal period, or vice-versa. If the asymmetry of the acoustic windows is achieved by thickness alone, the desired difference in thickness between the two windows is given by $0.5(n+0.5)\lambda$, where n is an integer and $\lambda$ is the wavelength of the signal in the window material. If, for example, the transmitter window is 5 wavelengths thick, the receiver window thickness would be 5 plus or minus 0.25, 0.75, 1.25, 1.75, etc. wavelengths. The desired time difference can also be achieved via asymmetry in the material properties (in particular the speed of sound) of the respective windows, or by a combination of thickness and materials properties.

While the present disclosure is generally described herein in relation to flow meters, it should be understood that the present disclosure may be applied to other ultrasonic-based measurement equipment using transducers in a pitch-catch arrangement where it is desirable to inhibit secondary reflections that originate in the transducer housings.

Ultrasonic Measurement System

Referring now to FIG. 1, a block diagram of an ultrasonic measurement system 100 is shown, according to some embodiments. In some embodiments, the ultrasonic measurement system 100 includes a meter body 101, a flow conduit 102, and meter electronics 103. The meter electronics 103 may include a display 104, an input/output circuit 105, and a processor 106. The processor 106 may be configured to control the sending and receiving of ultrasonic signals, as described in greater detail herein. The processor 106 may be further configured to perform signal and data processing, as well as performing flowrate and output calculation. In some embodiments, the meter electronics 103 may be included in the meter body 101 (i.e., assembled as one unit). In other embodiments, the meter electronics 103 may be mounted on the meter body 101 or the flow conduit 102 separately. The input/output circuit 105 may include various analogue and/or digital inputs and outputs to perform the systems and methods described herein.

In some embodiments, and as described in greater detail below, the ultrasonic measurement system 100 includes at least one pair of transducers (i.e. transducer assemblies) in pitch-catch operation where a signal is transmitted from one transducer to another. The transducers may be located in housings, which in some cases have the asymmetric properties of the present disclosure. The processor 106 controls the application of an electronic signal to a transmitting transducer and the reception of an electronic signal from a receiving transducer. In addition to controlling the excitation of the transmitting transducer and the acquisition of the receiving signal by the receiving transducer, the processor 106 may perform other functions, such as signal processing and calculation of derived results. The processor 106 may be connected to output devices, which may be included in the input/output circuit 105. The processor 106 may be configured to perform flow measurements based on the determination of the transit times of the ultrasonic signals. Such flow measurement results may be recorded and stored or output in analogue or digital form.

Flow Meter

Figure 2:
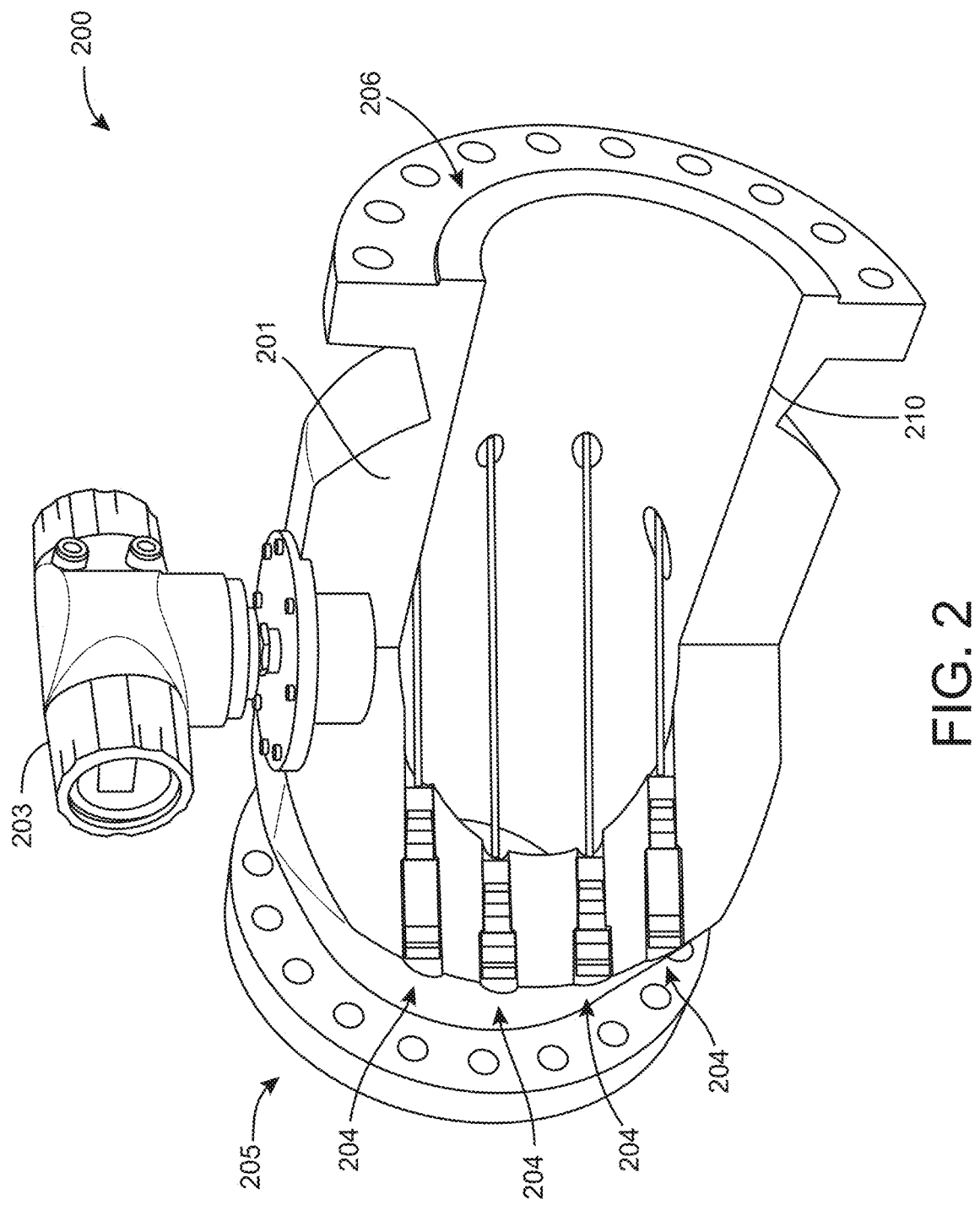
FIG. 2 is a perspective cross-sectional view of a flow meter, which can be implemented in the flow measurement system of FIG. 1, according to some embodiments.

Referring now to FIG. 2, a perspective cross-sectional view of a flow meter 200 is shown, according to some embodiments. The flow meter 200 may be identical or substantially similar to the ultrasonic measurement system 100 described above with reference to FIG. 1. In some embodiments, the flow meter 200 includes a flow meter body 201, flow meter electronics 203, and fluid inlet/outlet ports 205 and 206. While the systems and methods disclosed herein generally refer to ultrasonic flow meters—such as the flow meter 200—this is merely meant to be exemplary and should not be considered limiting, as other types of ultrasonic systems may be considered. Ports 205, 206 may act as an inlet port or an outlet port respectively, and/or vice versa.

In some embodiments, the flow meter electronics 203 includes a processing circuit including one or more processors and memory (not shown). The processor can be implemented as a general purpose processor, an application specific integrated circuit (ASIC), one or more field programmable gate arrays (FPGAs), a group of processing components, or other suitable electronic processing components. The flow meter electronics 203 may function substantially similar to the meter electronics 103 depicted in FIG. 1.

In some embodiments, the flow meter 200 includes transducer assemblies 204 arranged upstream and downstream of one another in a pitch-catch relationship to send acoustic energy along an acoustic path through the fluid flowing in a conduit, as discussed in greater detail below with reference to FIGS. 3 and 4. The transducer assemblies 204 may be disposed within apertures formed by the flow meter body 201. In some embodiments, the transducers may be slightly recessed within the apertures such that the transducer assemblies 204 do not directly interface an inner surface 210 of the flow meter body 201. The flow meter electronics 203 determines the transit times for upstream and downstream signal transmission and uses those measured upstream and downstream transit times in combination with other inputs to calculate the velocity in each measurement plane and to infer the flow rate of the fluid.

A non-limiting example of this type of meter is a CAL-DON™ ultrasonic flow meter(s). The CALDON™ meter uses a compact transmitter enclosure that can be integrally mounted to the meter body or remote pipe mounted. Within the meter body are multiple pairs of fully integrated piezoelectric ultrasonic transducers forming acoustic measurement paths. These paths typically cross the flow stream at an angle of between 45 and 65 degrees so that there is a difference in the transit time of the ultrasonic signals, depending on whether the sound pulse is traveling with or against the direction of flow. The difference in transit times is measured along each path. The meter's electronics infer velocity on each path and perform an integration of axial velocity to compute an output of volumetric flow rate.

Figure 3:
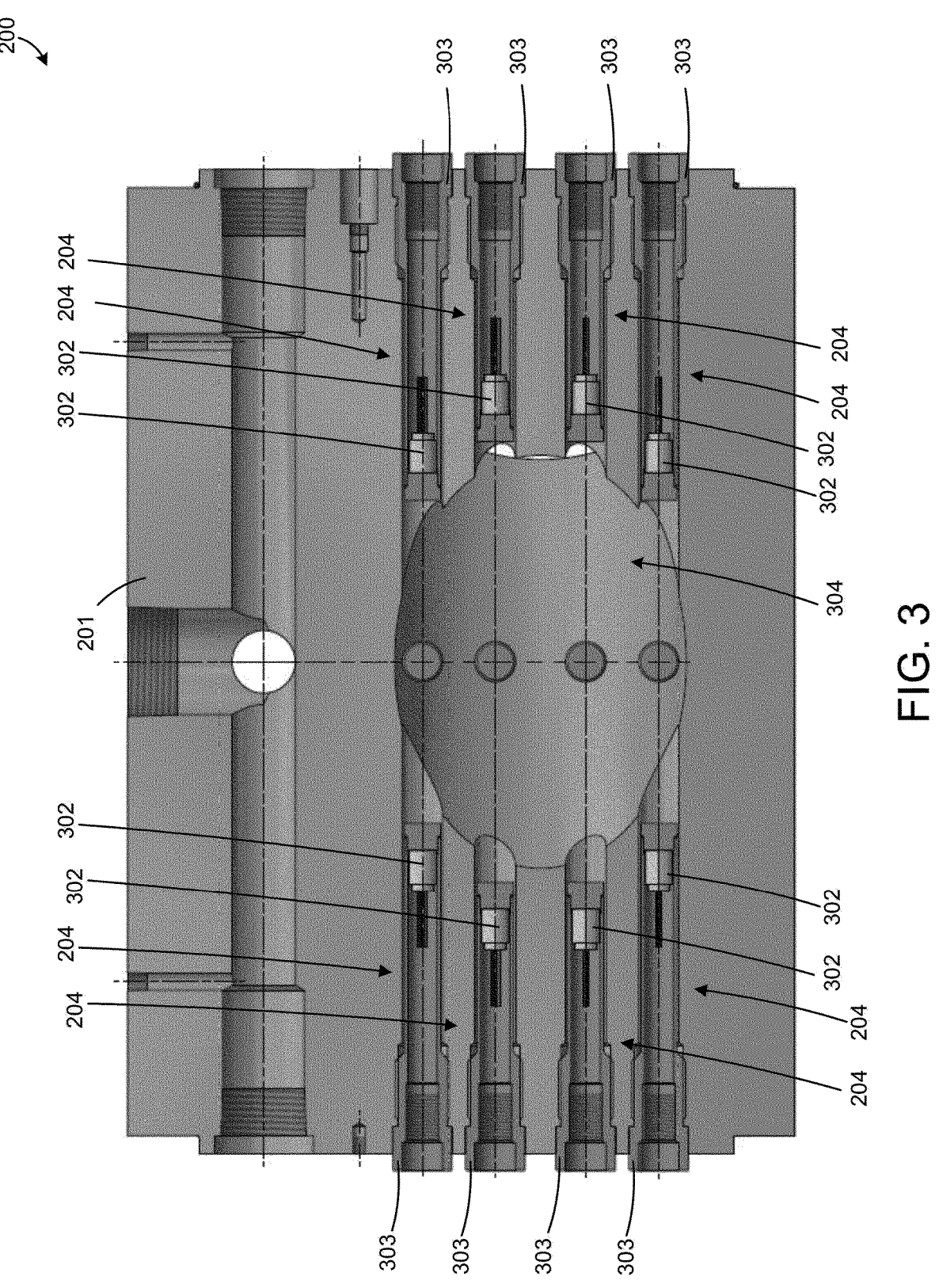
FIG. 3 is a cross-sectional view of a flow meter, according to some embodiments.

Referring now to FIG. 3, a cross-sectional view orthogonal to the one of the transducer planes and a parallel to another transducer plane is shown, according to some embodiments. As shown, the transducer assemblies 204 may include transducer modules 302 located (i.e., installed) inside transducer housings 303. The transducer housings 303 are described in further detail below in regards to FIGS. 5A and 5B. The transducer housings 303 may be implemented as shown in FIG. 3 such that the transducer modules 302 within the transducer housings 303 can provide ultrasonic signals through the fluid flowing through a passageway 304 through which fluid flow is to be measured. Accordingly, fluid flow may be measured, at least in part, through the use of the transducer modules 302 within the transducer housings 303 that form, at least in part, the transducer assemblies 204. As shown, and described in greater detail below, the transducer assemblies 204 are arranged in a pitch-catch configuration. In some embodiments, the transducer housings 303 are attached to the flow meter body 201, forming a seal that keeps the fluid from exiting. Of course, the method of attachment of transducer housings 303 and sealing can vary (i.e., a flange on the outside of the meter body, use of O-rings, use of retaining rings, use of threaded seal(s), etc.), and should not be considered limiting. The transducer housings 303 and corresponding windows (described in greater detail below with reference to FIGS. 5A and 5B) may also be formed in a single part with the meter body itself rather than being separate components.

Figure 4:
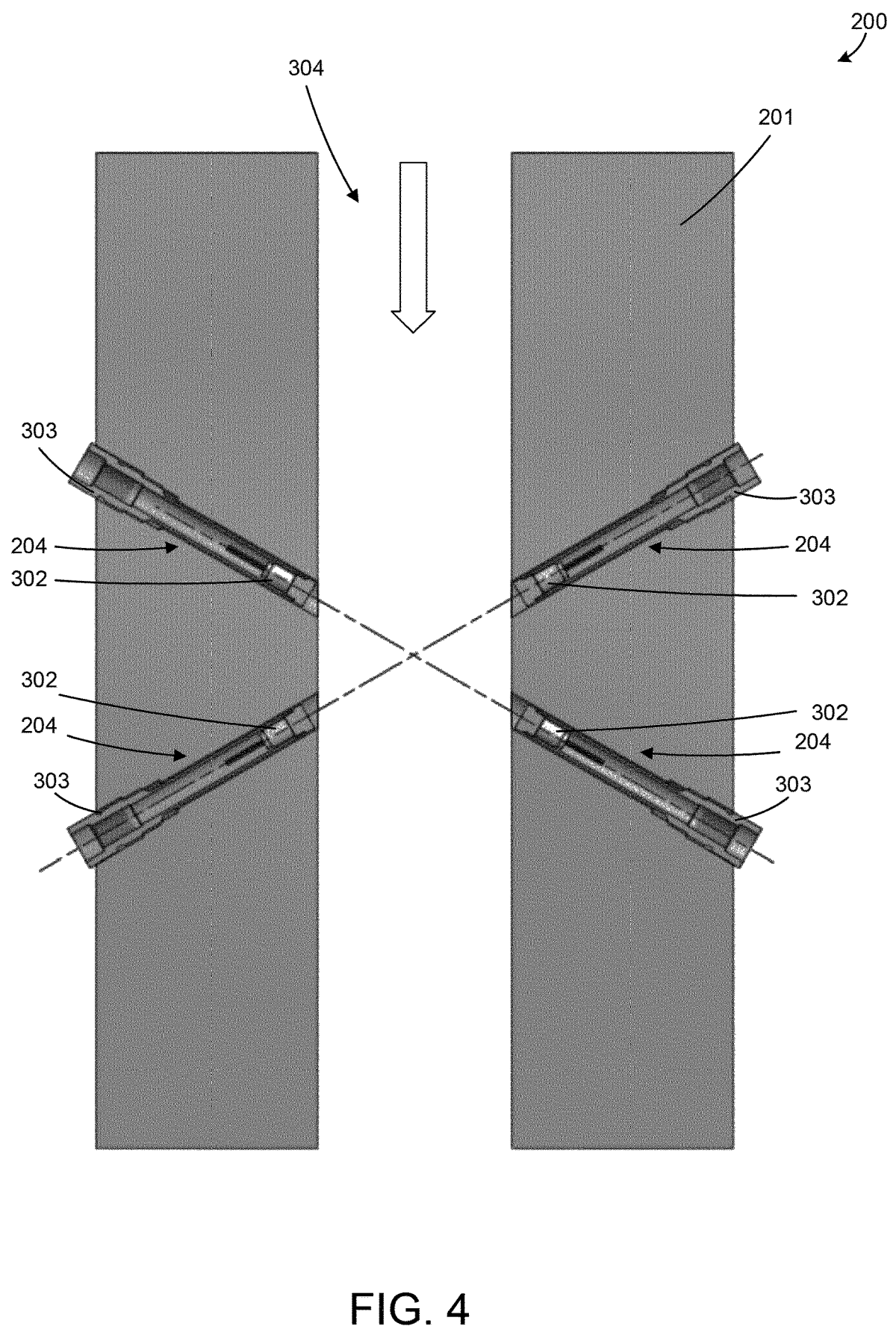

Referring now to FIG. 4, another cross-sectional view of the interior of the flow meter 200 is shown, according to some embodiments. FIG. 4 shows a view of the transducer housings 303 being installed through the flow meter body 201. The arrow shows the flow path for passageway 304. As suggested above, the transducer modules 302 that perform the ultrasonic pulses for the transducer assemblies 204 are located within the transducer housings 303. As shown, and described in greater detail below, the transducer assemblies 204 are arranged in a pitch-catch configuration.

Transducer Overview

Figure 5A:
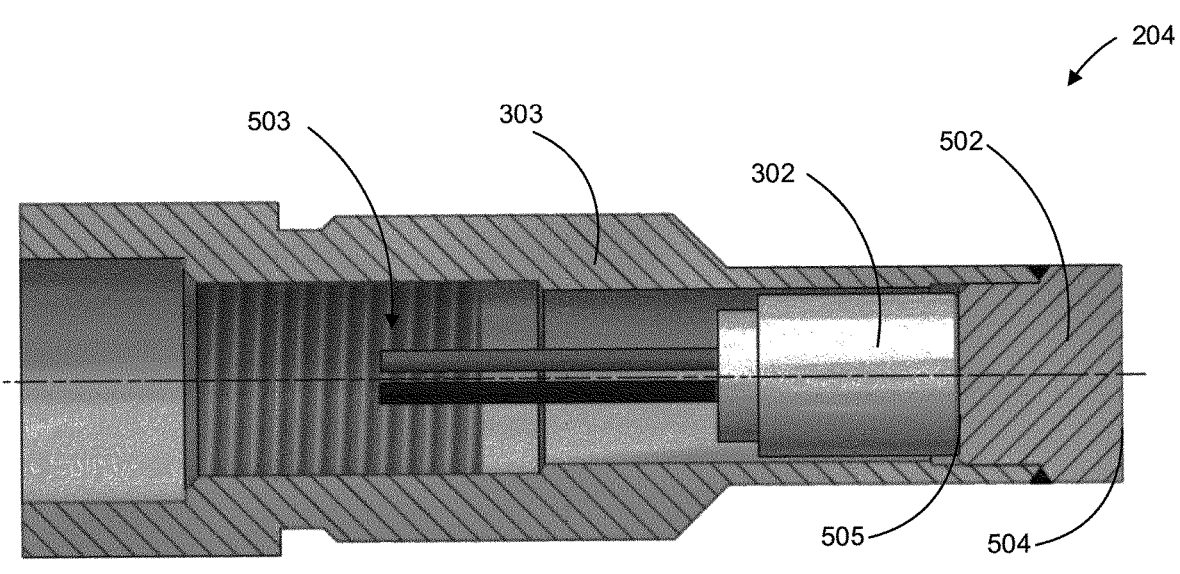
FIG. 5A is a cross-sectional view of a transducer assembly which can be implemented in the flow meter of FIG. 2, according to some embodiments.
Figure 5B:
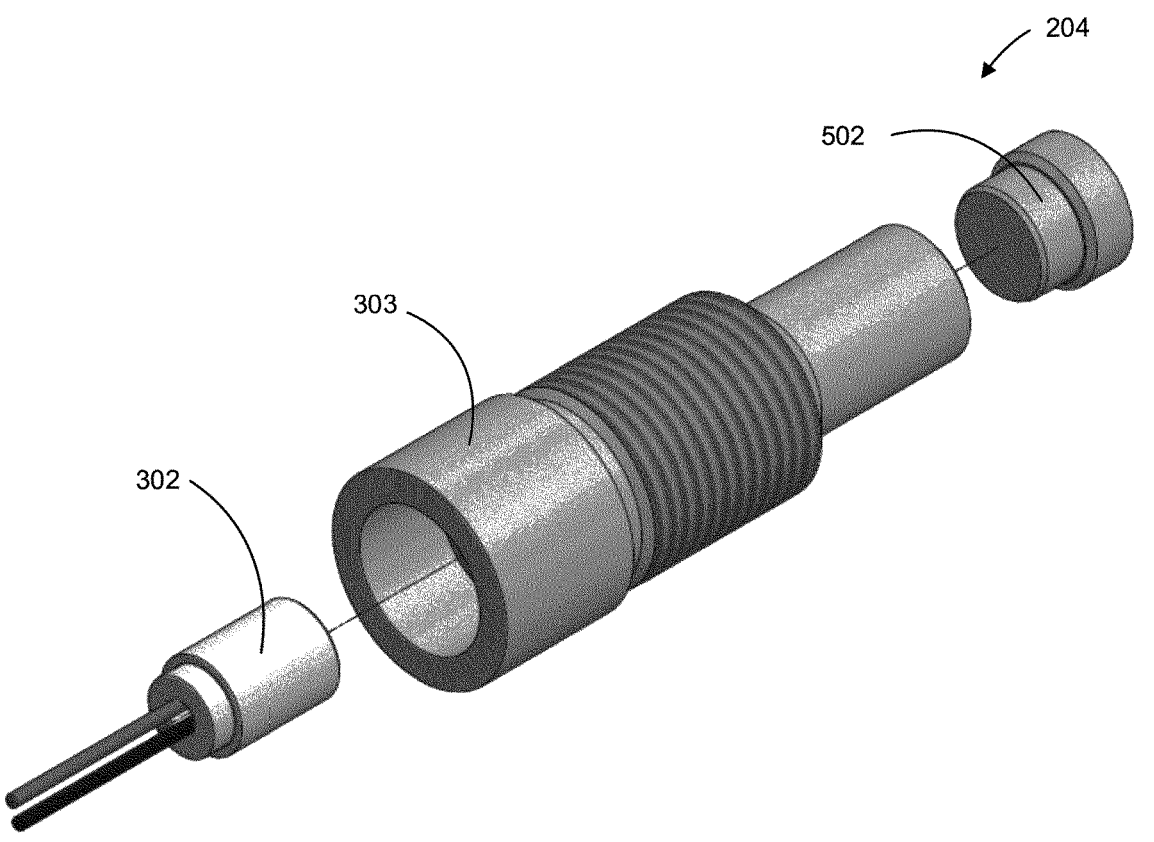
FIG. 5B is an exploded view of the transducer assembly of FIG. 5A, according to some embodiments.
Figure 6:
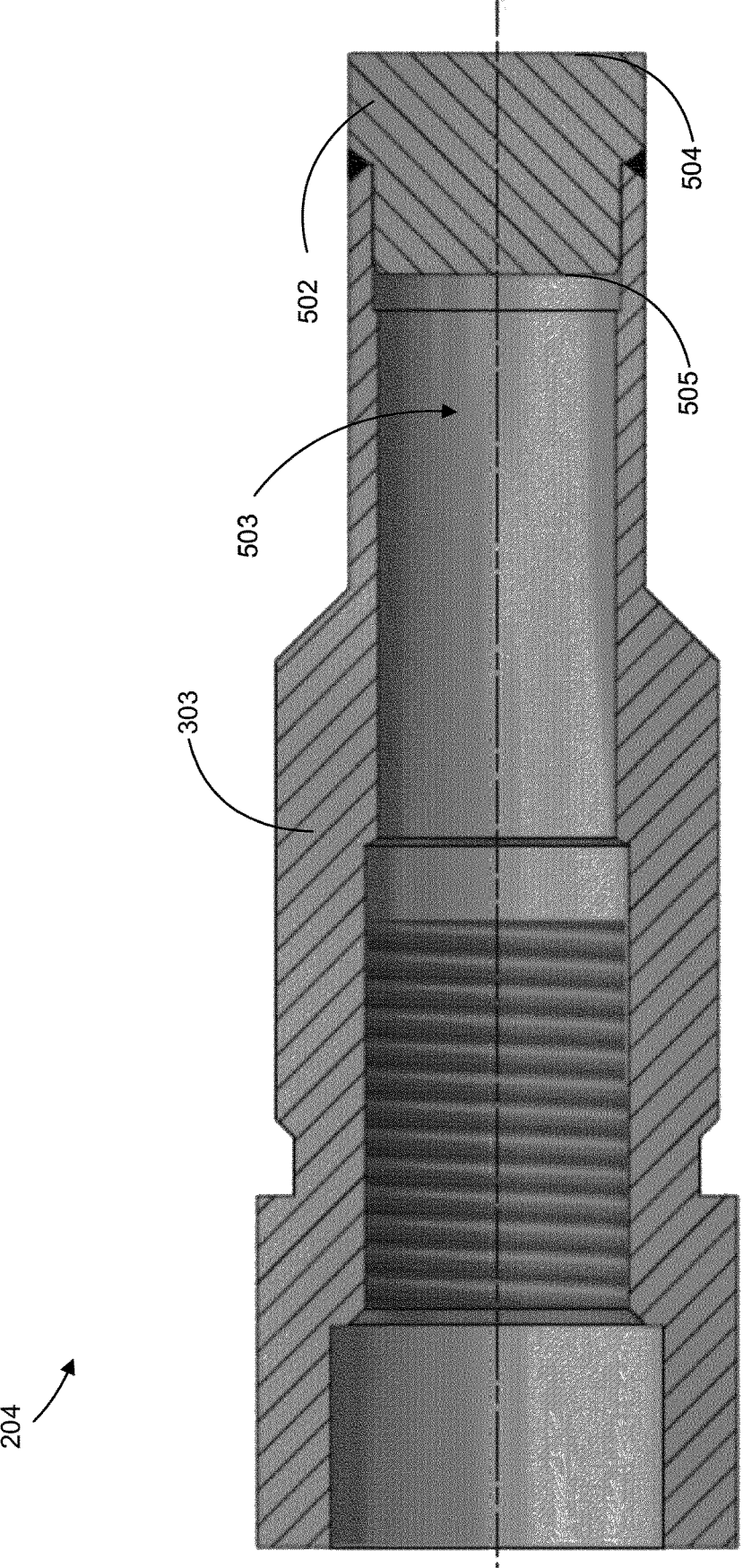
FIG. 6 is a cross sectional view of the transducer housing of FIGS. 5A and 5B, according to some embodiments.

Referring now to FIGS. 5A, 5B, and 6, the transducer assembly 204 is shown in greater detail, according to some embodiments. FIG. 5A shows a side cross-sectional view of the transducer assembly 204. FIG. 5B shows a perspective exploded view of the transducer assembly 204, according to some embodiments. Generally, the transducer assembly 204 includes the transducer module 302 and the transducer housing 303. FIG. 6, however, shows a side-cross sectional view of the transducer assembly 204 without the transducer module 302. The transducer housing 303 includes an acoustic window 502 (i.e., a buffer, etc.). As shown in FIG. 5A, the transducer housing 303 may form a cavity 503 within which the transducer module 302 may be located. In some embodiments, the transducer assembly 204 may further include a cap (i.e., a "compression screw") used to seal the transducer module 302 within the transducer housing 303. As discussed above, the transducer assembly 204 may be installed in the flow meter body 201. The transducer module 302 is capable of providing an ultrasonic signal (i.e., an ultrasonic pulse, waveform, etc.) along a signal path. The acoustic window 502 is a thickness of material disposed between the transducer module 302 and the media through which the ultrasonic signal is to be transmitted, such as the process fluid flowing through the passageway 304 depicted in FIGS. 3 and 4. As shown in FIG. 5A in particular, the transducer housing 303 may form an acoustic window/process fluid interface 504 and a transducer module/acoustic window interface 505 through which the ultrasonic signal is accordingly transmitted. The ultrasonic signals produced by the transducer module 302 travel into and through the acoustic window 502, and ultimately into the fluid flowing through the passageway 304. In some embodiments, the acoustic window 502 is used to protect the transducer assembly 204 or prevent exposure of the transducer assembly 204 to process conditions occurring in the passageway 304, including the fluid flowing through the passageway 304. In some embodiments, the acoustic window 502 is multiple wavelengths in thickness. The acoustic window 502 may be made of any suitable material for ultrasonic signal transmission including, but not limited to, stainless steel, carbon steel, aluminum, epoxy, plastic, and urethane. In some embodiments, some or all of the transducer housing 303, acoustic window 502, and flow meter body 201 are installed together as separate parts. In other embodiments, some or all of the transducer housing 303, acoustic window 502, and flow meter body 201 are machined from or manufactures as a single piece of material, rather than being installed together as separate parts.

Asymmetrical Transducer Windows

Figure 7:
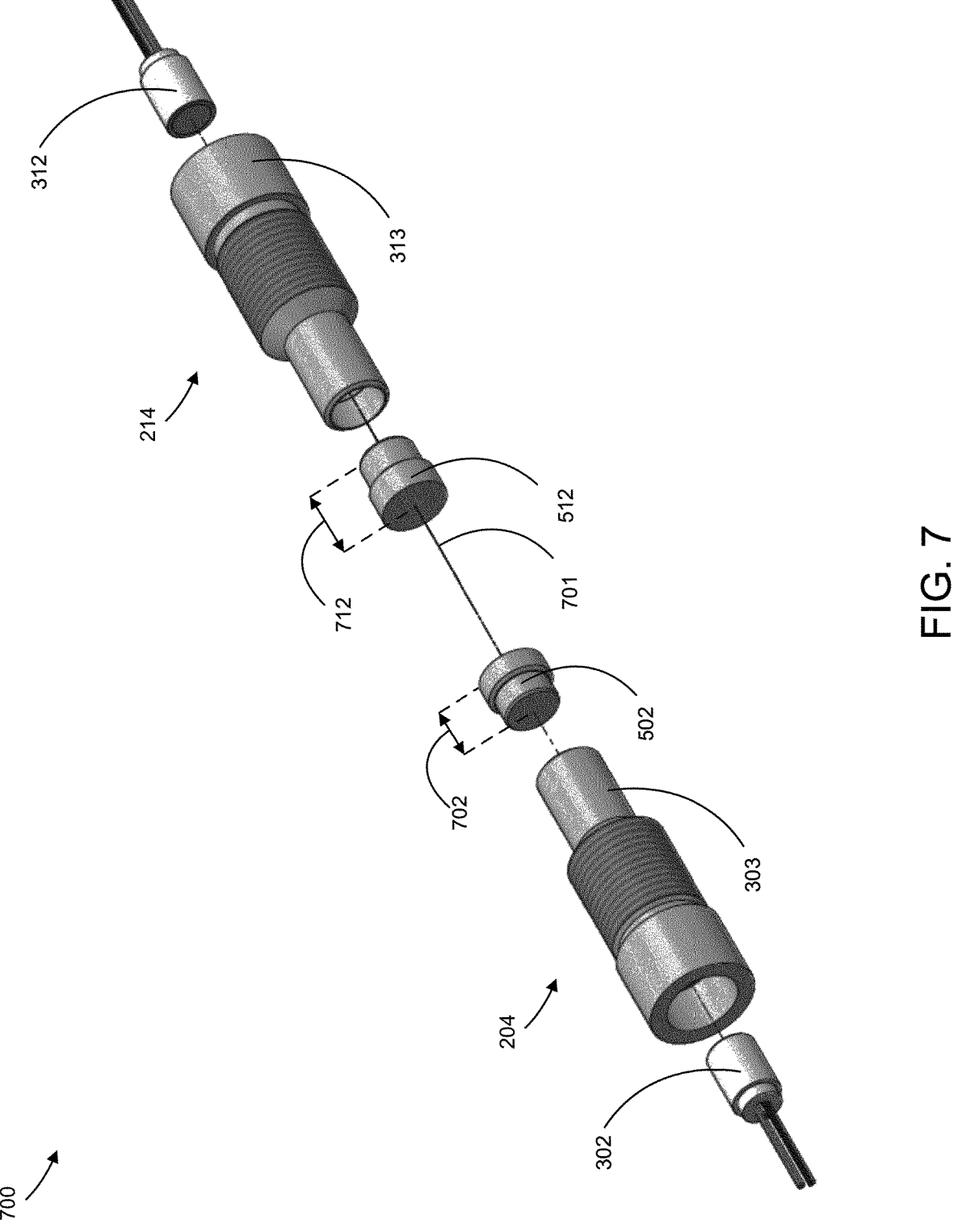
FIG. 7 is an exploded view of the transducer of FIGS. 5A and 5B interacting with a second transducer, according to some embodiments.

Referring now to FIG. 7, a measurement path (or pitch-catch transmission link) 700 includes the transducer assembly 204 depicted in FIGS. 2, 3, 4, 5A, 5B and 6 and a corresponding transducer assembly 214 depicted in FIGS. 2, 3, and 4, according to some embodiments. The transducer assembly 214 may be similar to the transducer assembly 214, but positioned such that the transducer assemblies 204 and 214 form a pitch-catch relationship, as depicted above with reference to FIGS. 3 and 4. As shown, the transducer assembly 204 and the transducer assembly 214 form a transmission link along a signal path 701. The transducer assembly 204 transmits an ultrasonic pulse (via the transducer module 302) along the signal path 701 to the transducer assembly 214 (i.e., the ultrasonic pulse is received by a transducer module 312). Accordingly, the acoustic window 502 may be termed a "transmitter" window and an acoustic window 512 included in transducer assembly 214 may be termed a "receiving" window. However, the transducer assemblies 204 and 214 may reciprocate functionality (i.e., transmitting and receiving) by alternating between transmitting an ultrasonic signal and receiving an ultrasonic signal along the signal path 701. The pitch-catch configuration does not rely on which of the transducer assemblies 204 or 214 is the transmitter and which is the receiver, but rather that the pair of transducer assemblies 204 and 214 form a transmission link (i.e., the signal path 701) for the transmission and receiving of ultrasonic signals. Therefore, either of the transducer assembly 204 and the transducer assembly 214 may be described as "transmitting" or "receiving" in various embodiments. The ultrasonic signal itself is a pressure wave with various characteristics, one of which is wavelength. The acoustic windows 502 and 512 have thicknesses 702 and 712, respectively. In some embodiments, and as discussed in greater detail below, the thicknesses 702 and 712 may be different (i.e., asymmetric) and may be multiple wavelengths in dimension.

In some embodiments, and as discussed in greater detail below in regards to FIGS. 8A and 8B, the ultrasonic signal produced by the transducer module 302 is at least partially reflected in the transducer housings 303 and 313 and the acoustic windows 502 and 512. As described in greater detail below, by implementing acoustic windows 502 and 512 with asymmetric geometries (including, but not limited to variations in thicknesses 702 and 712) and/or asymmetric material properties, one or the other of the reflected signal generated in the transmitting transducer housing and the reflected signal generated in the receiving transducer housing can be delayed with respect to the other such that they are out of phase with one another and thus destructively interfere rather than constructively interfere.

In some embodiments, and as described in greater detail below, if the aforementioned asymmetries are chosen properly (i.e., resulting in a half period delay), peaks associated with transmitting transducer reflection and those associated with the receiving transducer reflection will exhibit opposite polarity at a single instance in time resulting in a signal with a significantly diminished amplitude. In this way, the trailing secondary peaks may be inhibited.

Figures 8A, 8B:
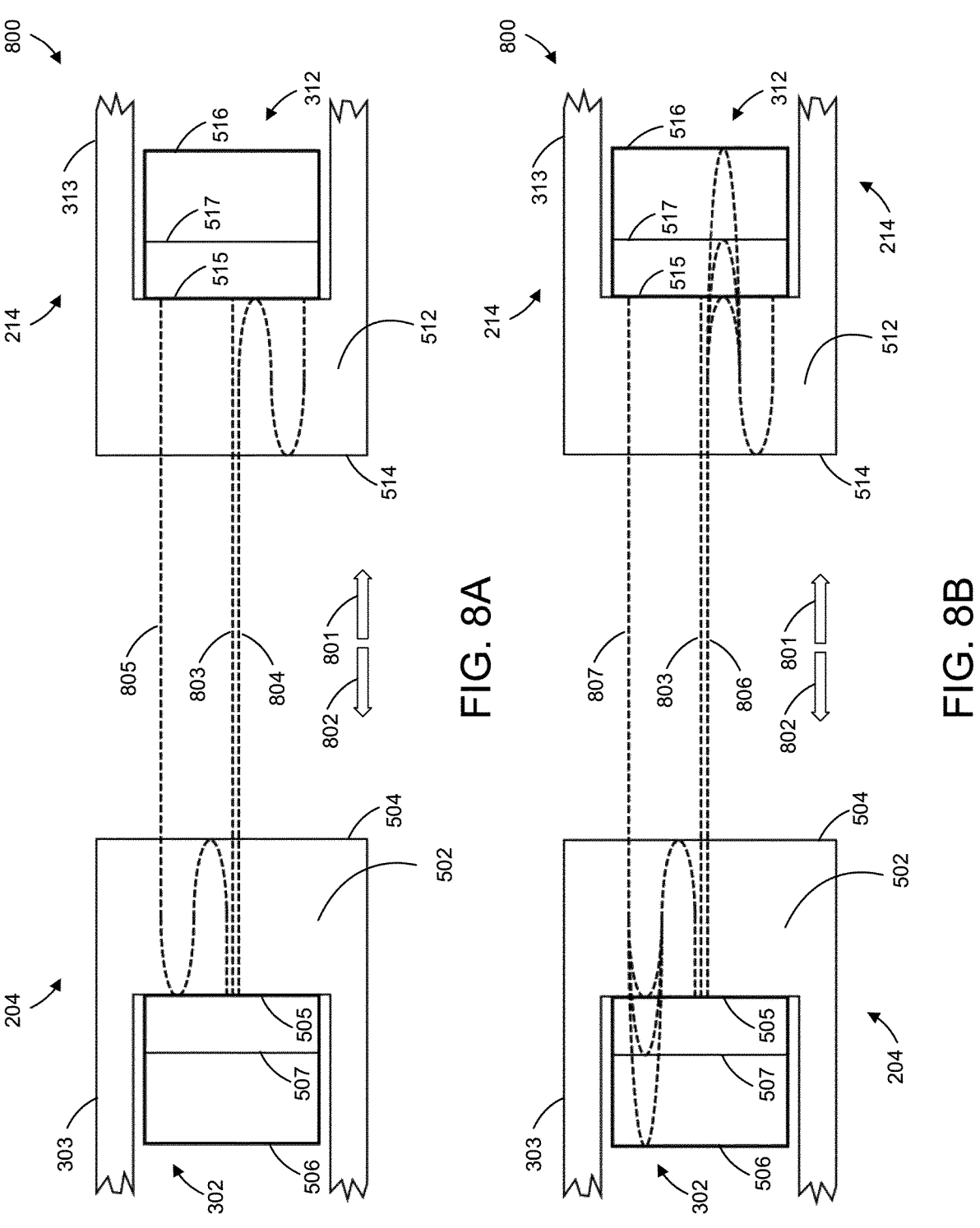
FIGS. 8A and 8B are diagrams of the path of an ultrasonic transmission between the interacting transducers of FIG. 7, according to some embodiments.

Referring now to FIGS. 8A and 8B, schematic of a measurement path 800 is shown, according to some embodiments. The measurement path 800 includes the transducer assembly 204 and the transducer assembly 214, according to some embodiments. As shown, an ultrasonic signal transmitted from the transducer assembly 204 is depicted reflecting on various surfaces between the transducer assembly 204 and the transducer assembly 214. As described above in regards to FIGS. 5A and 5B, the transducer assembly 204 includes the transducer module 302 and the transducer housing 303. The transducer module 302 includes a back wall 506, a component interface (i.e., a piezoelectric disc to backing mass interface) 507, and a window interface (i.e., an acoustic window interface, a front interface, etc.) 505. The transducer housing 303 includes the acoustic window 502 and the acoustic window process fluid interface (i.e., a fluid interface) 504. Similarly, the transducer assembly 214 includes the transducer module 312, which includes a back wall 516, a component interface 517 within the transducer module 312, a window interface 515, and the transducer housing 313, which forms the acoustic window 512 and a fluid interface 514.

As shown, an ultrasonic signal is transmitted via the transducer assembly 204 to travel along a path (i.e., a signal path, measurement path, etc.) to the transducer assembly 214 (in a direction 801). Accordingly, in this example, the transducer assembly 204 may be interpreted as a transmitting transducer and the transducer assembly 214 may be interpreted as a receiving transducer. However, as discussed above, this merely exemplifies a single transmission, and either of the transducer assemblies 204 and 214 may function as transmitting or receiving transducers. The ultrasonic signal that is generated by the transducer assembly 204 must pass through some or all of the components (i.e., materials) forming the transducer assemblies 204 and 214 described above on the signal path to reach the transducer assembly 214. As suggested above, the ultrasonic signal may be reflected on various surfaces between the transducer assembly 204 and the transducer assembly 214. The various reflections described herein may be illustrated by example paths 803, 804, and 805 depicted in FIG. 8A and example paths 803, 806, and 807 depicted in FIG. 8B. However, it should be understood that the paths 803, 804, 805, 806, and 807 are depicted for merely for reference. For example, paths 803, 804, and 805, as well as paths 803, 806, and 807, are shown as offset from one another. Ultrasonic signal paths typically have a finite width and, as such, may overlap. The paths 803, 804, 805, 806, and 807 are depicted as offset from one another merely for clarity. Ultimately, the paths 803, 804, 805, 806, and 807 are depicted herein merely to indicate where various reflections may occur and how many times the signals may traverse the acoustic windows 502 and 512, and are not depicted to illustrate a particular location relative to one another.

In some embodiments, the ratio of transmitted ultrasonic signal versus the portion of reflected ultrasonic signal is dependent on the acoustic impedance of the adjoining materials. Each material exhibits an acoustic impedance dependent on its density and its speed of sound. The larger the difference in the acoustic impedance of the two adjoining materials the larger the ratio of ultrasonic signal reflected relative to the signal transmitted through to the adjoining material.

As shown, an ultrasonic signal (i.e., a primary ultrasonic signal) is transmitted from the transducer module 302 in a direction 801 into the acoustic window 502 (described in additional detail above in regards to FIGS. 5A, 5B, 6, and 7). The primary ultrasonic signal (see path 803 for an exemplary illustration) travels through the acoustic window 502 and into a process fluid between the transducer assemblies 204 and 214, such as the fluid flowing through the passageway 304 depicted in FIGS. 3 and 4. When the primary ultrasonic signal reaches the fluid interface 504, a portion of the ultrasonic signal will be reflected back towards the transducer module 302 due to the acoustic impedance mismatch of the acoustic window 502 and the process fluid (see paths 805 and 807 for exemplary illustrations). The portion of the primary ultrasonic signal that was reflected will travel back towards the transducer module 302 in a direction 802. At the window interface 505, the internal component interface 507, or the back wall 506, a portion of the reflected ultrasonic signal will be reflected back again towards the acoustic window 502 and fluid interface 504 in the direction 801. Which interface among the window interface 505, component interface 507, or back wall 506 contributes the strongest reflection will depend on the acoustic impedance mismatch between the adjoining media that form the acoustic window 502 and the transducer module 302 itself. At the fluid interface 504, a portion of this reflected ultrasonic signal is then transmitted through the fluid interface 504 in the direction 801 and through the process fluid. This ultrasonic signal will be delayed from the primary signal in the direction 801 by an amount of time that at a minimum includes the transit time required to transverse the acoustic window thickness (the thickness 702 depicted in FIG. 7, for example) twice.

As shown, the primary signal traveling in the direction 801 that was first transmitted to the process fluid will travel to the transducer assembly 214. A portion of the primary signal will be transmitted through the fluid interface 514 where it will travel through the acoustic window 512 to the window interface 515. A portion of this signal will be transmitted to the transducer module 312 creating a measured primary signal, such as a primary ultrasonic signal 903 depicted in FIG. 9. A portion of the primary signal, however, will be reflected at the window interface 515, the component interface 517, or the back wall 516 (see paths 804 and 806 for exemplary illustrations). Which interface of the window interface 515, component interface 517, or the back wall 516 contributes the strongest reflection will depend on the acoustic impedance mismatch between the adjoining media that comprise the acoustic window 512 and the transducer module 312 itself. To achieve the desired characteristics in the primary signal, the transducer modules 302 and 312 are manufactured to be nominally identical, and thus the interface that makes the largest reflection (window interface, component interface, or back wall) will normally be the same on both sides of the ultrasonic signal path. This reflected signal will then travel in the direction 802 back across the acoustic window 512 to the fluid interface 514. If the acoustic window 502 and the acoustic window 512 are the same geometry and thickness (i.e., symmetrical) the reflected signals in the receiving transducer acoustic window 512 will reach the fluid interface 514 at the same instant in time as the afore-mentioned reflected signal from the transducer assembly 204. In other words, the reflected signals illustrated for reference by paths 804 and/or 806 will reach the fluid interface 514 at the same time as the reflected signals illustrated for reference by paths 805 and/or 807. The portion of the reflected signal from the transducer assembly 204 that is transmitted into the acoustic window 512 will combine constructively with the reflected signal and will arrive in phase at the window interface 515. For commonly used transducer materials and ultrasonic flow meter materials the constructive interference of these two reflected signals will produce a secondary ultrasonic signal, such as a secondary ultrasonic signal 905 depicted in FIG. 9, exhibiting peaks that can be larger in amplitude than the primary ultrasonic signal 903.

Figure 9:
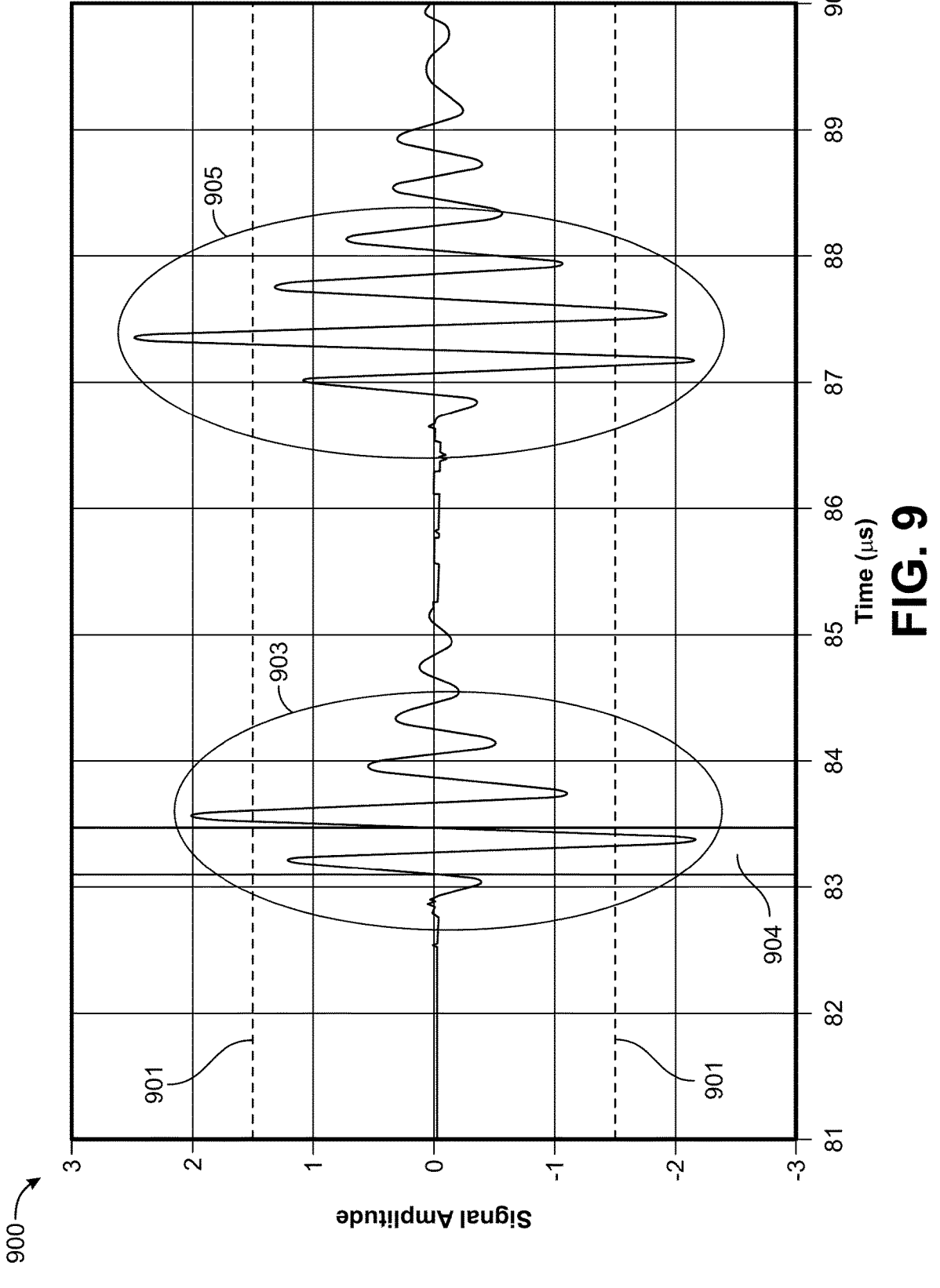
FIG. 9 is a waveform graph depicting a signal with characteristics corresponding to constructive interference between reflected ultrasonic signals arriving later than the primary ultrasonic signal, according to some embodiments.

Referring now to FIG. 9, the primary ultrasonic signal 903 and the secondary ultrasonic signal 905 suggested above are shown on a waveform graph 900, according to some embodiments. The presence of the secondary ultrasonic signal 905 with peaks larger in amplitude than the primary ultrasonic signal 903 can create control and measurement problems for algorithms used in ultrasonic flow meters, or other ultrasonic measurement devices which determine the transit time of an ultrasonic signal. One such algorithm that the presence of larger secondary signal peaks can have an undesirable effect on is the automatic gain control (AGC) algorithm. The objective of AGC is to amplify the signal until it reaches a desired maximum peak voltage. It is intended that the signal peaks in the measured signal that drive the AGC algorithm are in the leading edge of the signal also referred to as the primary signal (i.e., the primary ultrasonic signal 903). However, with larger secondary signal peaks present, shown herein as the secondary ultrasonic signal 905, the secondary signal peaks can erroneously be used to set the AGC level. Likewise, threshold-based peak detection algorithms used in timing measurement, which aim to consistently identify peaks in the leading edge of the signal, such as a leading edge 904, can suffer from inaccuracy when there are larger secondary peaks present.

This can occur when the relative amplitudes of the primary signal peaks are diminished due to the AGC operating on the secondary peaks. The lower relative amplitude of the primary signal peaks may then cause peaks in the primary ultrasonic signal 903 to fall below the amplitude thresholds 901 that are intended to be used to identify the specific peaks and zero crossings to be used for transit time measurements.

The present disclosure relates to a solution for the afore-mentioned issues discussed at least in regards to FIG. 9. Referring again to FIG. 7, the measurement path 700 in a pitch-catch configuration includes the transducer assembly 204 and the transducer assembly 214 with acoustic windows 502 and 512, respectively. The acoustic windows 502 and 512 may be asymmetrical acoustic windows of different thickness/geometry and/or material. For example, the acoustic window 502 may form the thickness 702 to be of a different thickness and/or geometry than the thickness 712 of the acoustic window 512. Although not explicitly shown, the acoustic window 502 and the acoustic window 512 may be formed of different materials alternatively to, or in addition to, forming different thicknesses. Accordingly, the desired time difference can also be achieved via asymmetry in the material properties (in particular the speed of sound) of the respective windows, or by a combination of thickness and materials properties.

Figure 10:
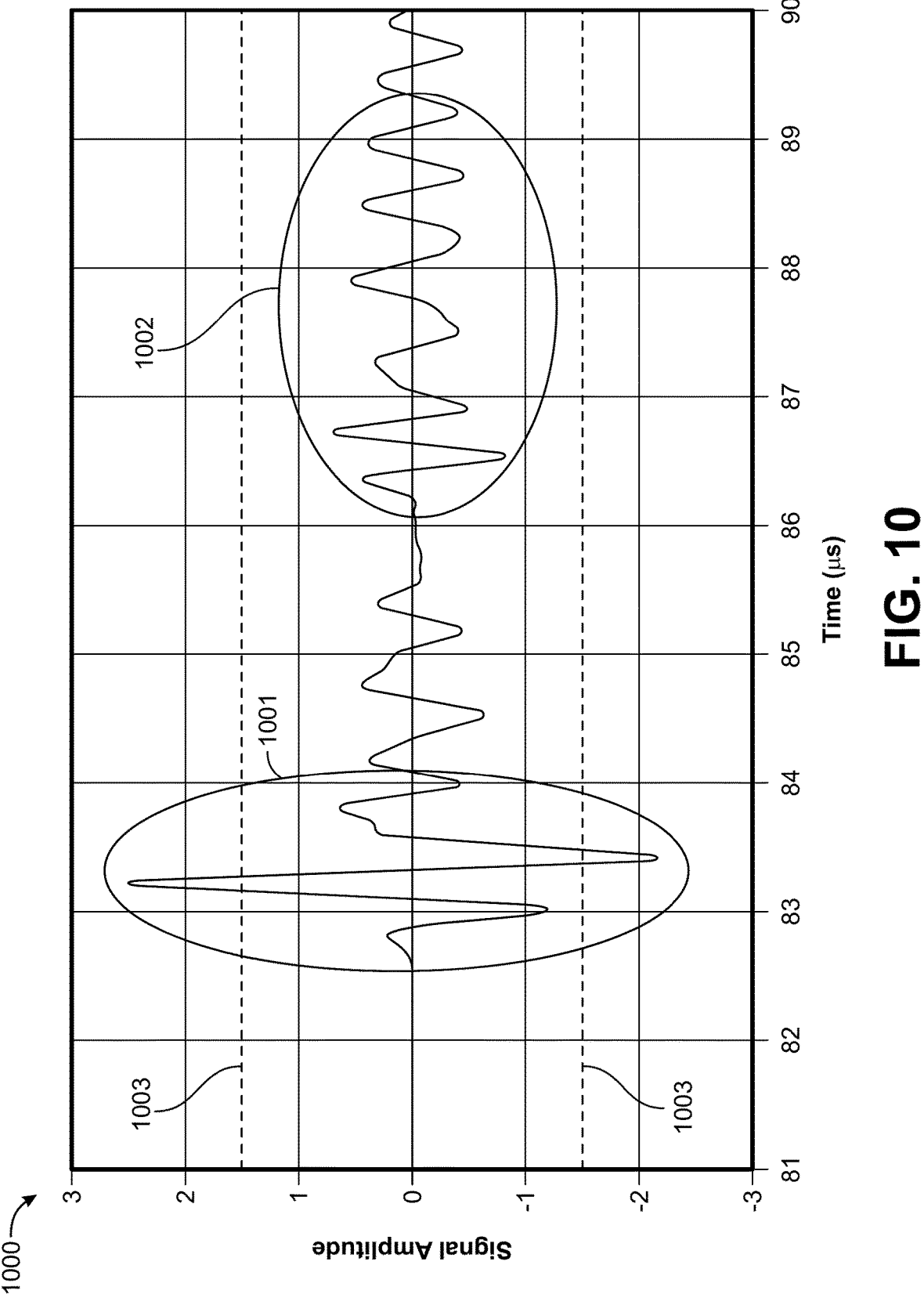
FIG. 10 is a waveform graph depicting a signal with characteristics corresponding to destructive interference between reflected ultrasonic signals arriving later than a primary ultrasonic signal, according to some embodiments.

Referring now to FIG. 10 (and with additional reference to FIG. 8), a waveform graph 1000 depicts a primary ultrasonic signal 1001 and a secondary ultrasonic signal 1002, according to some embodiments. The purpose of the different acoustic window thickness/geometry and/or material is to prevent the constructive interference of reflected signals that produce a large secondary received signal, such as the secondary ultrasonic signal 905 depicted in FIG. 9 with peaks that are greater in amplitude than peaks in a primary signal, such as the primary ultrasonic signal 903. For asymmetry that results in a time difference between reflected signals that is shorter than the duration of the primary signal, proper design of the acoustic window thickness/geometry and/or material will promote destructive interference of the reflected signals, diminishing the secondary peaks, such as the secondary ultrasonic signal 1002, in the ultrasonic signal forming the waveform graph 1000. In some embodiments, the round-trip travel time of reflections through the transmitter window versus the receive window is designed to be different by one half (or an odd multiple of one half) of the expected signal period, or vice-versa. As a result, a reflected signal would be 180 degrees out of phase with another reflected signal when the two signals meet at a window interface, as described above with reference to FIGS. 8A and 8B. The out-of-phase signals will combine destructively resulting in secondary peaks of greatly diminished amplitude, as shown by the secondary ultrasonic signal 1002 compared to the primary ultrasonic signal 1001. To accomplish this phasing of reflected signals, if the asymmetry is achieved by thickness alone, the desired difference in thickness between the two windows is given by $0.5(n+0.5)\,\lambda$, where n is an integer and $\lambda$ is the wavelength of the signal in the window material. $\lambda$ can be calculated as the period multiplied by the speed of sound of the media. The period is the time it takes for a signal to complete one full cycle (i.e., a round-trip transmit time). If, for example, the transmitter window is 5 wavelengths thick, the receiving acoustic window thickness would be 5 plus or minus 0.25, 0.75, 1.25, 1.75, etc. wavelengths.

In some embodiments, the transit time of signals that have undergone reflection in the transmitting transducer window may be given by Equation 1 below:

$$t_{ref\_T} = 3t_{w\_T} + t_{w\_R} + t_{other} \qquad \text{Equation 1.}$$

where $t_{ref\_T}$ is the round-trip transit time for the signal that has undergone reflection in the transmitting transducer window, $t_{w\_T}$ is the transit time required to cross the transmitter window, $t_{w\_R}$ is the transit time required to cross the receiver window, and $t_{other}$ represents any other contribution to the transit time. Likewise, for the signals that have undergone reflection in the receiving transducer window, the transit time may be given by Equation 2 below:

$$t_{ref\_R} = 3t_{w\_R} + t_{w\_T} + t_{other} \qquad \text{Equation 2.}$$

where $t_{ref\_R}$ is the round-trip transit time for the signal that has undergone reflection in the transmitting transducer window. Therefore, the difference in overall transit times between signals that have undergone reflection in the transmitting transducer window and signals that have undergone reflection in the receiver window may by combining Equations 1 and 2 as given by Equation 3 below:

$$t_{ref\_T} - t_{ref\_R} = 2(t_{w\_T} - t_{w\_R}) \qquad \text{Equation 3.}$$

As discussed above, the round-trip travel time of reflections through the transmitter window versus the receive window may be designed to be different by one-half (or an odd multiple of one half) of the expected signal period, or vice-versa in order to promote destructive interference of the reflected signals. Therefore, the desirable difference in round-trip travel time may be applied to Equation 3 as given by Equation 4 below:

$$2(t_{w\_T} - t_{w\_R}) = (n+0.5)T \qquad \text{Equation 4.}$$

where n is an integer, and T is the expected signal period. In general, and as suggested above, the travel time of reflections in the window may be described as the ratio between the thickness of the transducer window and the speed of sound. Accordingly, the difference in round-trip travel time between two transducer windows may be described as a difference in these ratios. Thus, the desirable difference in round-trip travel time as defined by Equation 4 may be alternatively given by Equation 5 below:

$$2\left(\frac{x_{W\_T}}{c_{w\_T}} - \frac{x_{w\_R}}{c_{w\_R}}\right) = (n+0.5)T. \qquad \text{Equation 5}$$

where $x_{w\_T}$ is the thickness of the transmitting transducer window, $x_{w\_R}$ is the thickness of the receiving transducer window, $C_{w\_T}$ is the speed of sound though the transmitting transducer window (which may be based on the material properties of the transducer window) and $C_{w\_R}$ is the speed of sound though the receiving transducer window. In some embodiments, the transmitting transducer window and the receiving transducer window are made of the same material, therefore $C_{w\_T}$ and $C_{w\_R}$ in Equation 5 may each be defined as c, and thus the desirable difference in round-trip travel time as defined in Equation 5 may be simplified as a relationship between the window thicknesses, given by Equation 6 below:

$$x_{w\_T} - x_{w\_R} = \frac{(n+0.5)cT}{2}. \qquad \text{Equation 6}$$

Given that wavelength ($\lambda$) is equal to sound speed over frequency (c/f) and that the expected signal period T is equal to 1/f, it follows that cT from Equation 6 is equal to $\lambda$, and thus the relationship between the window thicknesses (resulting in the desirable difference in round-trip travel time) as defined in Equation 6 may be further simplified to be given by Equation 7 below:

$$x_{w\_T} - x_{w\_R} = 0.5(n+0.5)\lambda \qquad \text{Equation 7.}$$

Therefore, in some embodiments, the desirable difference in round-trip travel time may be achieved through a relative difference in window thicknesses, as summarized by Equation 7.

In other embodiments, and as suggested above, the desirable difference in round-trip travel time may be achieved through a relative variation in the material properties of the windows rather than a difference in window thicknesses. As discussed above, the material properties of the windows may result in a relative difference in the speed of sound through the windows, and thus the desirable difference in transit time defined in Equation 5 may be interpreted as a function of $C_{w\_T}$ and $C_{w\_R}$ in the case where window thicknesses are equal, i.e. $x_{w\_T} = x_{w\_R} = x$, as given by Equation 8 below:

$$2x\left(\frac{1}{c_{w\_T}} - \frac{1}{c_{w\_R}}\right) = (n+0.5)T. \qquad \text{Equation 8}$$

In order to reach the desirable difference in round-trip travel time, it may be useful to vary the material properties of one window relative to the other window, and thus the relationship defined by Equation 8 may be adjusted as given by Equation 9 below and simplified as given by Equation 10 below:

$$\frac{1}{c_{w\_R}} = \frac{1}{c_{w\_T}} - \frac{(n+0.5)T}{2x}. \qquad \text{Equation 9}$$

$$c_{w\_R} = \frac{2xc_{w\_T}}{2x - c_{w_T}(n+0.5)T}. \qquad \text{Equation 10}$$

As summarized by Equation 10, the speed of sound through the receiving transducer window may be determined based on the measured speed of sound through the transmitting transducer window (or vice versa) in order to achieve the desired difference in round-trip travel time.

In other embodiments still, in cases where it may be difficult to achieve desired difference in sound speed and/or window geometry, it should be clear to those skilled in the art that frequency and hence the period T, can also be varied to achieve the desired difference in round-trip travel time.

It should be noted that in practice the ultrasonic signal is a transient signal comprising multiple quasi-sinusoidal half-cycles. The reduction of the reflected peaks in the received signal waveform will typically be most effective when n in the equations above is equal to 0 (i.e., when the difference in arrival times is equal to half of the period T. However, if for reasons of practicality this is difficult to achieve, then a difference of (n+0.5)T may still be effective.

The above description and associated equations are provided to give insight into how asymmetric windows can be designed, and is not intended to be limiting. As suggested above, and as one skilled in the art should appreciate, there are any number of ways to vary the geometries and material properties of the transmitting transducer and the receiving transducer to achieve the desired result.

Figure 11A:
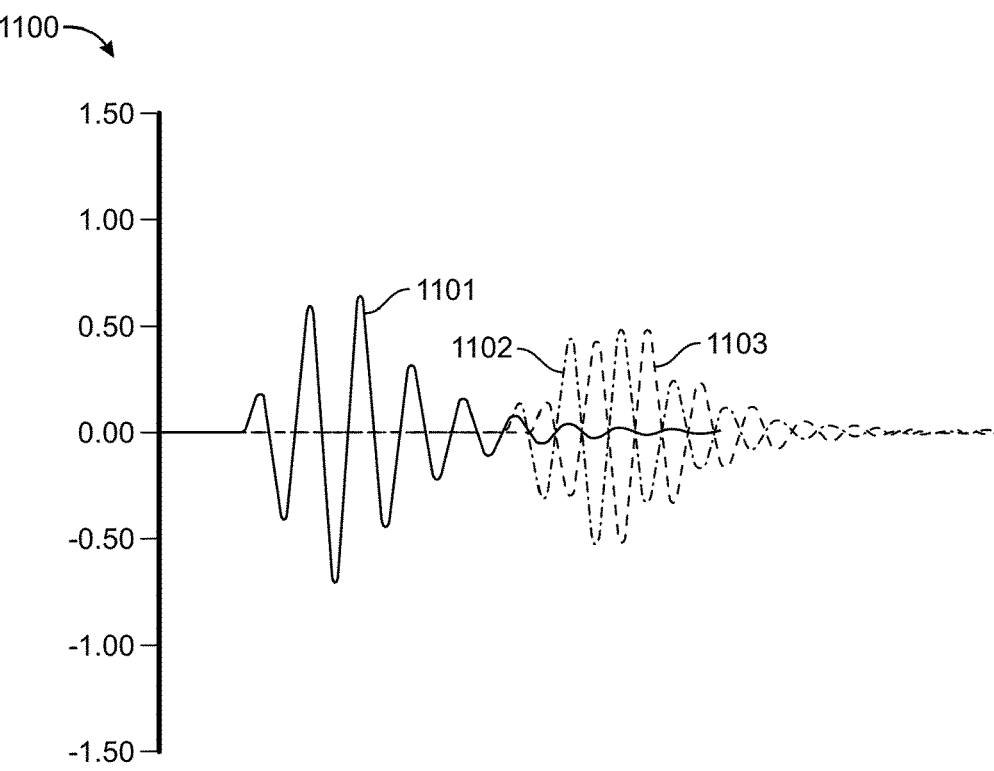
FIGS. 11A and 11B are waveform graphs depicting destructive interference between reflected ultrasonic signals arriving later than a primary ultrasonic signal, according to some embodiments
Figure 11B:
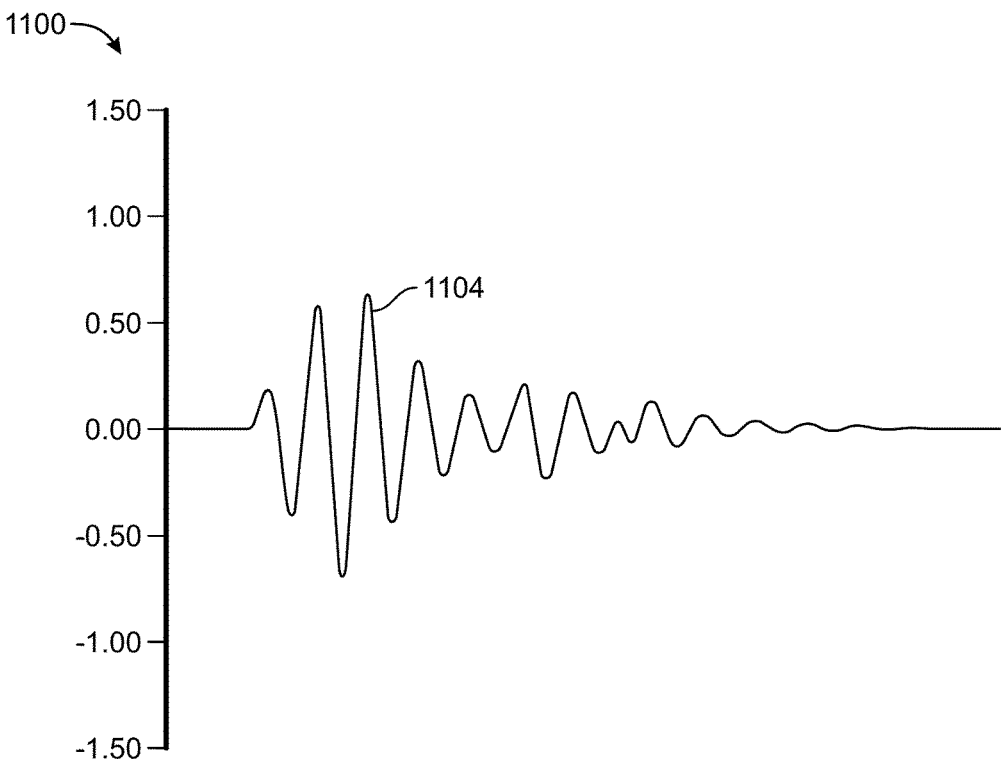

Referring now to FIGS. 11A and 11B, an example waveform graph 1100 depicting destructive interference is shown, according to some embodiments. In FIG. 11A, the waveform graph 1100 includes a primary ultrasonic signal 1101, a first reflected ultrasonic signal 1102, and a second reflected ultrasonic signal 1103. As shown in FIG. 11A, the first reflected ultrasonic signal 1102 and the second reflected ultrasonic signal 1103 are delayed relative to the primary ultrasonic signal 1101 by 5 and 5.5 signal periods, respectively. As shown in FIG. 11B, a resulting waveform 1104 is depicted, demonstrating how the difference of 0.5 signal periods between the first reflected ultrasonic signal 1102 and the second reflected ultrasonic signal 1103 depicted in FIG. 11A causes them to be diminished with respect to the primary ultrasonic signal 1101 depicted in FIG. 11A in the resulting waveform 1104.

Figure 12:
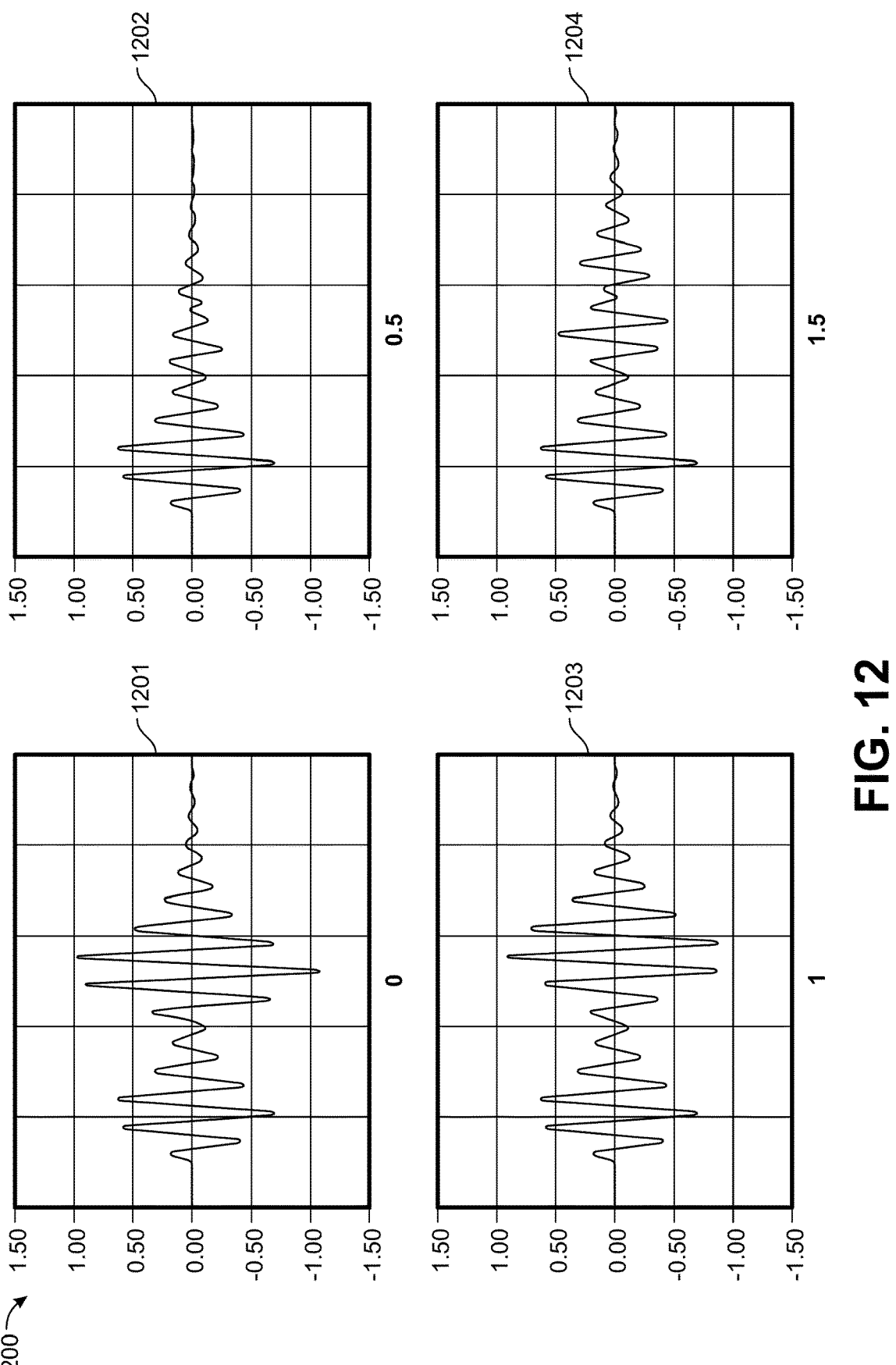
FIG. 12 is a set of waveform graphs depicting the varying amplitudes of reflected signals depending on the relative delay between the primary ultrasonic signal and the reflected signals, according to some embodiments.
Figure 12:
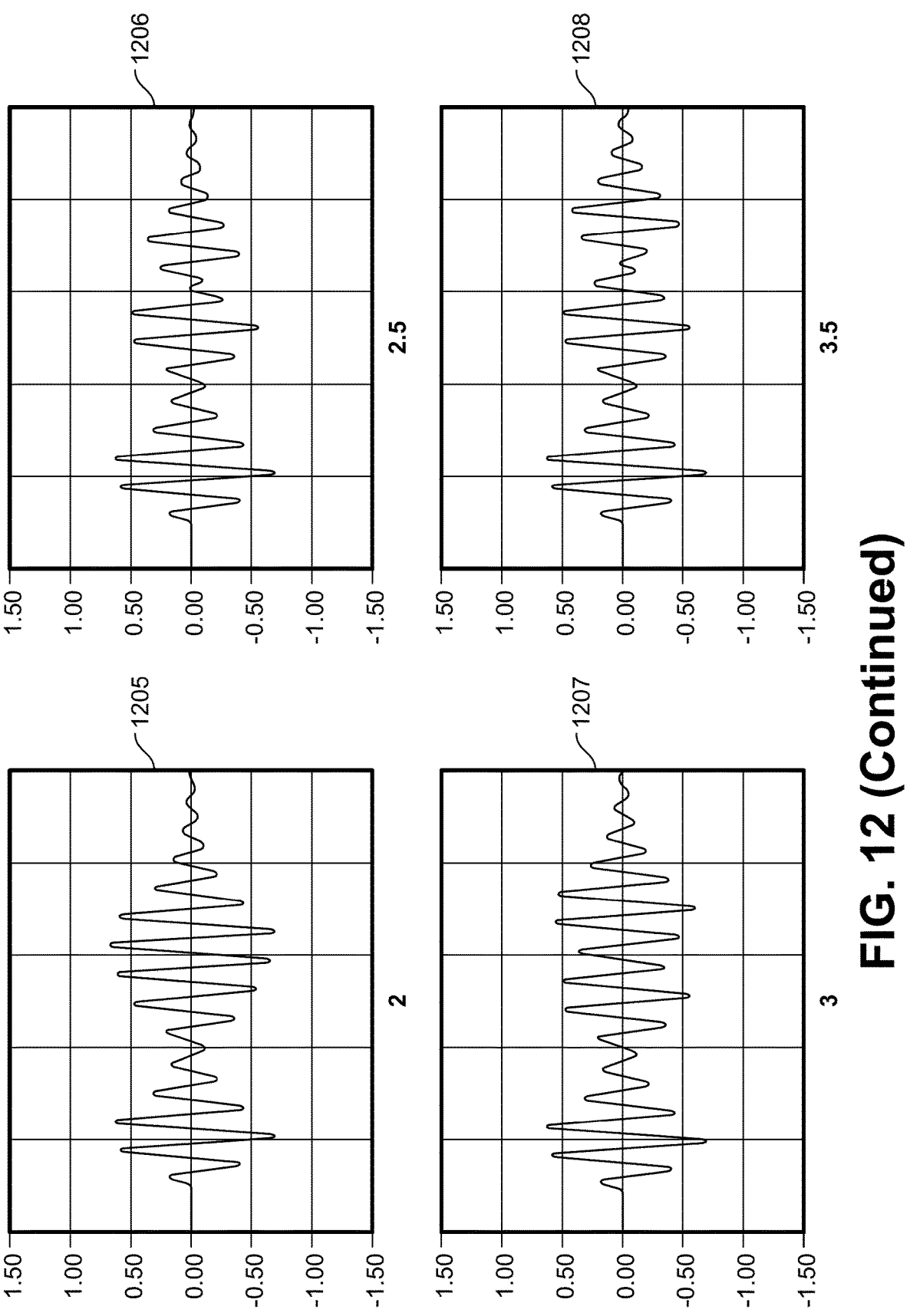

Referring now to FIG. 12, a set 1200 of resulting waveforms produced by the same process as in regards to FIGS. 11A and 11B is shown, according to some embodiments. Set 1200 includes waveforms 1201-1208 where the delay between the first reflected signal and second reflected signal has been varied in fractions of 0.5 signal periods, from 0 to 3.5 (as labeled below each waveform). It can be observed from the 1201 waveform that the amplitudes of the secondary peaks are greatest (therefore the least desirable) when the delay is zero. Likewise, it can be observed from the 1202 waveform that the amplitudes of the secondary peaks are lowest (therefore the most desirable) when the delay between reflections is 0.5 signal periods. It can also be observed in the remaining cases depicted in waveforms 1203-1208 that, in general, the amplitude of the secondary peaks are lower in the remaining cases where the delay is an odd-multiple of 0.5 signal periods, as shown in waveforms 1204, 1206, and 1208 compared to waveforms 1201, 1203, 1205, and 1207. It may further be observed that when the delay between reflections is longer than the duration of the primary signal, the reflections can become completely separated in time (as shown in waveforms 1206, 1207, and 1208), resulting in another means by which the secondary peaks can be diminished by the present disclosure, as described in regards to FIGS. 13A and 13B below.

Figure 13A:
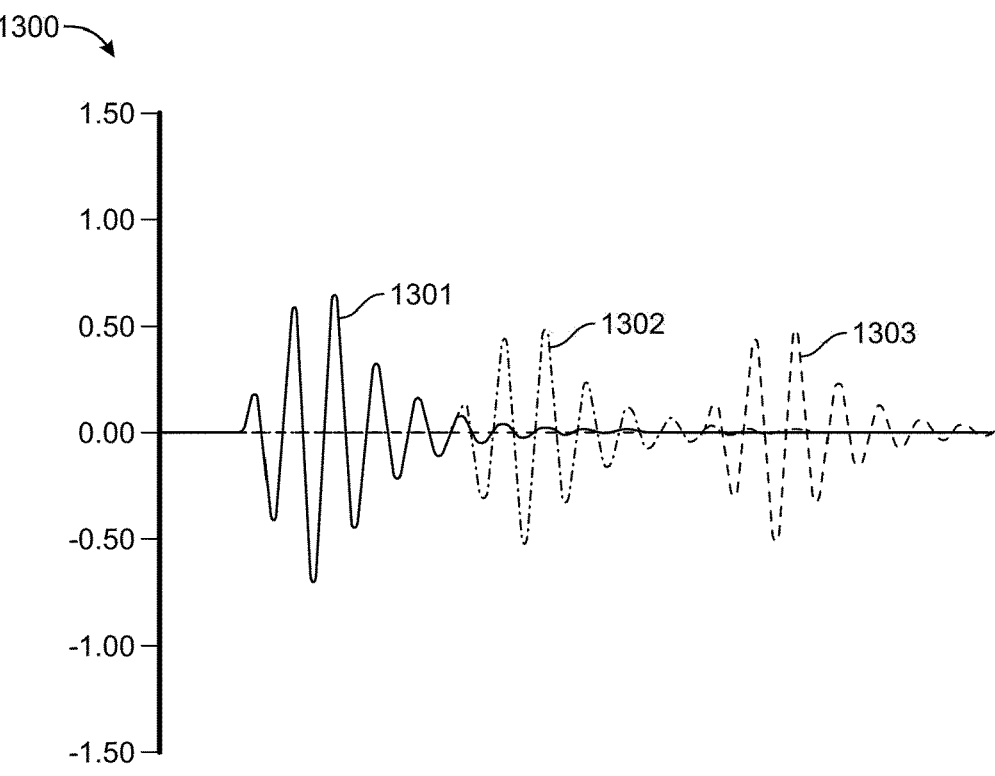
FIGS. 13A and 13B are waveform graphs depicting separation of reflected ultrasonic signals following a primary ultrasonic transducer based on a particular relative delay, according to some embodiments.
Figure 13B:
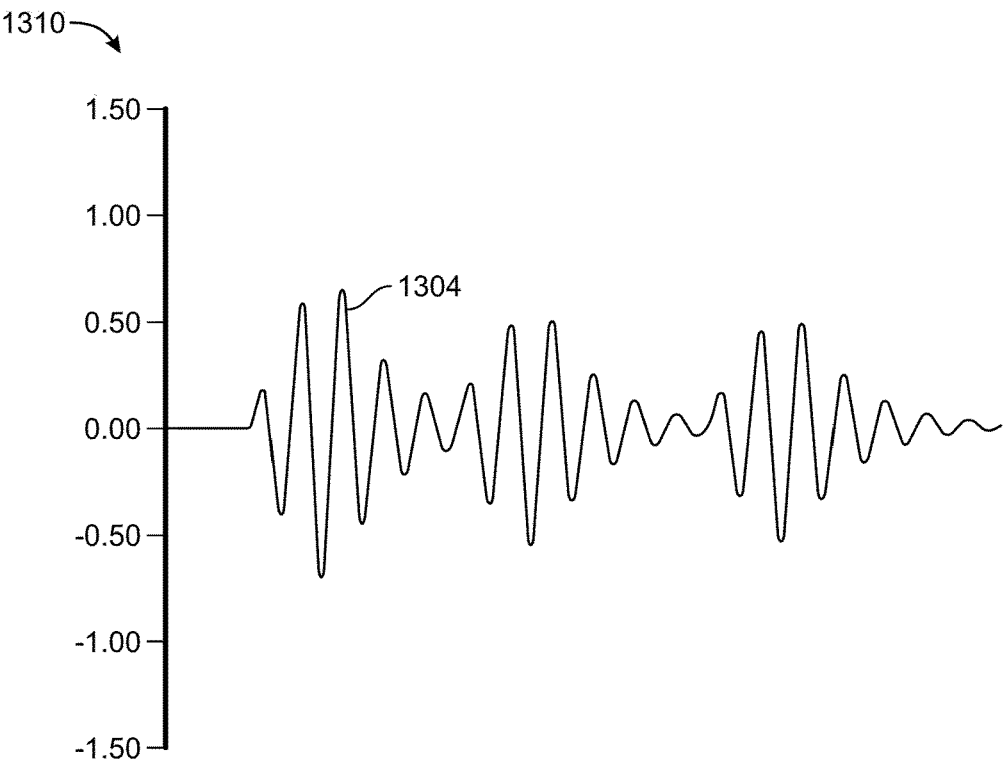

Referring now to FIGS. 13A and 13B, waveform graphs 1300 and 1310 are shown, according to some embodiments. Waveform graph 1300 includes a primary ultrasonic signal 1301, a first reflected ultrasonic signal 1302, and a second reflected ultrasonic signal 1303. As shown, the delay between the first reflected ultrasonic signal 1302 and the second reflected ultrasonic signal 1303 is of a similar length in time to the duration of the primary ultrasonic signal 1301. In this case, properties of the acoustic windows need not be a specific thickness so long as the time delay introduced by the asymmetry between the acoustic windows is longer than the overall duration of the primary ultrasonic signal 1301. Incorporating this concept with Equation 4 above, the desirable difference in round-trip travel time may be given as Equation 11 below:

$$2(t_{w\_T} - t_{w\_R}) > Y \qquad \text{Equation 11.}$$

where Y is the effective duration of the primary signal. In practice, the duration Y may be the time taken from the start of the signal to a point where its amplitude has diminished to a level such that the sum of the amplitudes of the first peak and the last peak within the duration Y are less than the amplitude of the maximum peak within the primary signal.

In some embodiments, the acoustic windows need not be parallel or of constant thickness. For example, if a window had a stepped or curved surface, a similar process to achieve asymmetry between the transmitting and receiving windows such that constructive interference of the secondary reflections is avoided could be applied by someone skilled in the art.

As described herein, the use of asymmetrical windows to avoid constructive interference or promote destructive interference of reflections may avoid undesirable secondary signal peaks with larger amplitudes than the primary signal peaks. The absence of these larger secondary signals may allow the AGC and threshold-based peak detection algorithms to operate with precision and accurately identify the leading-edge signal.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (i.e., permanent or fixed) or moveable (i.e., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (i.e., directly coupled), the generic definition of "coupled" provided above is modified by the plain language meaning of the additional term (i.e., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (i.e., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An ultrasonic system comprising a transmitter in connection with a first acoustic window that is in contact with a transmission medium and a receiver in connection with a second acoustic window that is also in contact with the transmission medium, wherein material properties of the first and second acoustic windows are asymmetrical.

2. The ultrasonic system of claim 1, wherein parameters of the first and second acoustic windows are selected to inhibit constructive interference of secondary reflections.

3. The ultrasonic system of claim 2, wherein a difference in transit time across the first and second acoustic windows is given by $(n+0.5)T$ where n is an integer and T is a period of a primary signal.

4. The ultrasonic system of claim 2, wherein asymmetry in the parameters of the first and second acoustic windows is sufficiently large such that a difference between round-trip transit times in the first and second acoustic windows is greater than a duration of a primary signal.

5. The ultrasonic system of claim 1, wherein asymmetry is achieved by having first and second acoustic windows of different thicknesses.

6. The ultrasonic system of claim 5, wherein the first and second acoustic windows are of the same material and a difference in thickness of the first and second acoustic windows is given by $0.5(n+0.5)\lambda$, where n is an integer and $\lambda$ is a wavelength of a primary signal provided by the transmitter.

7. The ultrasonic system of claim 1, wherein the material properties of the first and second acoustic windows are varied to achieve a desired asymmetry.

8. The ultrasonic system of claim 1, wherein thickness properties of the first and second acoustic windows are varied to achieve a desired asymmetry.

9. The ultrasonic system of claim 1, wherein both material properties and thicknesses are varied to achieve a desired asymmetry.

10. In an ultrasonic system for measuring flow in a medium comprising a transmitter and a receiver, a method comprising:

providing an ultrasonic signal through a first acoustic window of the transmitter, the first acoustic window being in contact with a transmission medium; and receiving the ultrasonic signal through a second acoustic window of the receiver, the second acoustic window being in contact with the transmission medium, wherein material properties of the first and second acoustic windows are asymmetrical.

11. The method of claim 10, wherein parameters of the first and second acoustic windows are selected to inhibit constructive interference of secondary reflections.

12. The method of claim 11, wherein a difference in transit time across the first and second acoustic windows is given by $(n+0.5)T$ where n is an integer and T is a period of a primary signal.

13. The method of claim 11, wherein asymmetry in the parameters of the first and second acoustic windows is sufficiently large such that a difference between round-trip transit times in the first and second acoustic windows is greater than a duration of a primary signal.

14. The method of claim 10, wherein asymmetry is further achieved by having first and second acoustic windows of different thicknesses.

15. The method of claim 14, wherein the first and second acoustic windows are each in a form of a plug with a first section with a first diameter that fits within a housing of the respective transmitter and receiver and a second section with a diameter larger than the first diameter.

16. The method of claim 10, wherein the material properties of the respective acoustic windows are varied to achieve a desired asymmetry.

17. The method of claim 10, wherein thickness properties of the first and second acoustic windows are varied to achieve a desired asymmetry.

18. The method of claim 10, wherein both material properties and thicknesses are varied to achieve a desired asymmetry.

19. An ultrasonic flow meter, comprising:

a pair of ultrasonic devices;

a meter body configured to be coupled to a conduit for a medium; and meter electronics in communication with the pair of ultrasonic devices configured to determine a flow in response to an ultrasonic signal, wherein the pair of ultrasonic devices are disposed in the meter body in opposition, wherein a first device of the pair of ultrasonic devices has a first acoustic window in contact with the medium and a second device of the pair of ultrasonic devices has a second acoustic window that is also in contact with the medium, wherein material properties of the first and second acoustic windows are asymmetrical.

20. The ultrasonic flow meter of claim 19, wherein a difference in transit time across the first and second acoustic windows is given by $(n+0.5)T$ where n is an integer and T is a period of a primary signal.

* * * * *